United States Patent Office 3,544,427
Patented Dec. 1, 1970

3,544,427
METHOD OF PRODUCTION OF UROKINASE
Nathan H. Sloane, Germantown, Tenn., assignor to Century Laboratories, Inc., Metairie, La., a corporation of Delaware
No Drawing. Filed Apr. 18, 1968, Ser. No. 722,212
Int. Cl. C07g 7/26; A61k 19/00
U.S. Cl. 195—66                                         7 Claims

ABSTRACT OF THE DISCLOSURE

Urokinase is extracted from urine by its adsorption on an insoluble blood serum protein precipitate which is contacted with the urine. The urokinase-containing precipitate is treated with cold alkali to solubilize the urokinase which is subsequently purified by dialysis. The insoluble blood protein precipitate employed herein is formed by the action of acid, particularly trichloroacetic and silicotungstic acids, or heat and dilute acid on blood serium protein.

BACKGROUND OF THE INVENTION

Field of the invention

This invention relates to a method for the extraction of urokinase from urine and in particular to a method whereby urokinase is extracted from urine by its adsorption on an insoluble blood serum protein precipitate with which the urine is contacted.

Description of the prior art

Urokinase, a substance found in mammalian urine, is of significance in the treatment of blood disorders which cause the formation of clots in the cardiovascular system. Persons afflicted with such disorders must be treated before thrombosis occurs and frequently now such treatment involves the administration of urokinase into the blood stream which dissolves existing blood clots and prevents further formation thereof.

Urokinase is an enzyme cofactor which stimulates the production of the clot-dissolving proteolytic enzyme plasmin in the blood. Other materials such as bacterial filtrates including staphylokinase and streptokinase also have the ability to promote the formation of plasmin. In view of the great quantities of urine which are available as a source of urokinase, a method which utilizes this source is economically desirable. However, large volumes of urine are required to obtain sufficient amounts of urokinase which necessitates a method whereby a urokinase-rich fraction of comparatively small unit volume can be quickly and efficiently isolated from the urine.

Heretofore, no method has been made available by which urokinase can be efficiently isolated from large volumes of urine. Certain processes involving the treatment of urine with acids have been utilized with some success. For example, the addition of benzoic acid to urine is a known method for the extraction of urokinase from urine. A U.S. Pat. No. 2,989,440, patented June 20, 1961, discloses a method for the adsorption of urokinase on benzoic acid which requires a number of cumbersome and inefficient steps for further purification of the urokinase.

U.S. Pat. No. 2,292,841, patented Aug. 11, 1942, discloses a method for the precipitation of protein from urine by tannic acid. But tannic acid is a denaturing agent which destroys enzymes and, therefore, it would not be expected to find use in a process for the production of the enzyme, urokinase. This patent discloses no attempt to recover urokinase and, in fact, the urokinase would be discarded in following the procedure described therein.

SUMMARY OF THE INVENTION

The present invention is based on the discovery that urokinase can be efficiently extracted from urine by its adsorption on an insoluble blood serum protein precipitate with which the urine is contacted. In the method of this invention, a blood serum protein precipitate is formed by the action of acid, particularly, trichloroacetic and silicotungstic acids, on blood serum protein. This invention contemplates a further means of producing such a precipitate by the application of heat to a solution of blood serum protein to which dilute acid has been added.

Broadly stated, urokinase is extracted from urine by contacting the urine with an insoluble blood serum protein precipitate. The urokinase-containing precipitate is recovered, suspended in a solution of cold alkali to solubilize the urokinase, and the urokinase solution is collected and purified by dialysis or by any other suitable means.

This invention permits the efficient and economical extraction from urine of a urokinase-rich fraction which is comparatively small in unit volume. The urokinase thus extracted can then be further purified. The urokinase is extracted from the urine in a form whereby it can be readily isolated for purification, thus eliminating the need for further cumbersome and inefficient separation steps.

DESCRIPTION OF THE PREFERRED PRACTICE OF THE INVENTION

Human urine, collected in the presence of a preservative such as chloroform to prevent the growth of harmful bacteria, is used herein to preclude the possibility of an adverse reaction in human recipients caused by a product produced from a non-human protein source. It is possible, however, that methods will eventually become available which will permit the use of non-human urine to be used as a source of urokinase in which case the methods of this invention may then be used with respect to such source material.

The insoluble blood serum protein precipitate employed herein as an adsorbent for urokinase is formed by the action of acid or heat and dilute acid on human serum protein. Again, since the urokinase to be produced herein is for use in human beings, human serum protein must be used. The possibility again exists that at some future time methods will become available which will permit serum proteins from other than human sources to be used herein, in which case, these serum sources will be suitable for the purpose of this invention.

It has been found that when dilute solutions (on the order of from 1 to 10% by weight) of trichloroacetic acid are added to human serum a precipitate is formed which is suitable for the extraction of urokinase from urine. Silicotungstic acid has similar ability to precipitate serum albumin. The silicotungstic acid-precipitated serum albumin is prepared by the addition of a dilute solution (from 1 to 10% by weight) of silicotungstic acid to a solution of serum albumin. A protein precipitate is thus produced which is capable of absorbing urokinase from urine.

In a similar manner, a blood serum protein precipitate may be formed by the application of heat to a solution of serum albumin or serum proteins to which dilute acid has been added. The serum albumin is precipitated as a coagulated mass and is effective as an adsorbent of urokinase. I have found that heating the serum albumin to a temperature in the range from 60 to 90° C. produces a satisfactory precipitate although this temperature range is not considered to be critical. Dilute organic (1% acetic) and inorganic (.1 N HCl) acids have been found to be quite effective in this method as an aid to precipitation of the serum proteins although precipitation can be effected in the absence of acid.

Investigation has shown that when methylated human serum albumin is added to urine it functions as an effective adsorbent for urokinase. The serum albumin is methylated by well-known processes including reaction thereof with dimethylsulfate. However, the urokinase activity adsorbed on this material is difficult to release. It is believed that treatment with urea or similar methods should be helpful in releasing the adsorbed urokinase in which case the methylated serum albumin will be a suitable adsorbent material for use in this invention.

EXAMPLE I

A blood serum protein precipitate was prepared by the addition of a 10% by weight aqueous solution of trichloroacetic acid to human blood serum. The precipitate thus formed was washed free of acid and approximately 5 to 50 mg. of this precipitate was added to 250 ml. of urine. The urine serum precipitate suspension was stirred for thirty minutes at ambient temperature. The precipitate was then collected by centrifugation, washed with cold water to remove acid and suspended in approximately 20 ml. of 0.05 M tris buffer at pH 7.4. Sodium hydroxide was added to this suspension until the pH was raised to pH 9.5. The solution was then dialyzed at a temperature in the range from 0° to 15° C. against tris buffer at pH 7.4. The urokinase activity remaining in the dialysis sac assayed at approximately 10 CTA units per ml.

EXAMPLE II

A precipitate of human serum albumin was prepared by the addition of a 10% solution by weight of silicotungstic acid to an aqueous solution of serum albumin. A precipitate was formed which was washed free of acid and added to 100 ml. of urine. The serum albumin precipitate was added in an amount such that the turbidity of the suspension indicated that a concentration of 50 mg. had been obtained. The urine was stirred with the precipitate for thirty minutes after which the precipitate was then separated by centrifugation and washed with cold water. The urokinase containing precipitate was then treated as in Example I. The assay for urokinase activity indicated an approximate concentration of 10 CTA units per ml.

EXAMPLE III

A precipitate of human serum albumin was prepared by the addition of several drops of a 1% aqueous solution of acetic acid to a solution of human serum albumin in distilled water. The solution was heated to a temperature in the range from 60° C. to 90° C. and coagulated material was formed which was washed free of acid and used as an adsorbent in the manner described in the examples above. This precipitate was added to urine in a concentration of from approximately 5 to 50 mg. precipitate per 250 ml. of urine. The urokinase thus obtained assays at approximately 10 CTA units per ml.

While this invention has been described hereinbefore in terms of a number of representative examples of the process thereof, the invention itself is not limited thereto, but rather comprehends all modifications of and departures therefrom properly falling within the spirit and scope of the appended claims.

I claim:
1. A method for the extraction of urokinase from urine which comprises:
   contacting said urine with an insoluble blood serum protein precipitate of the group consisting of trichloroacetic acid-precipitated serum, silicotungstic acid-precipitated serum albumin, methylated serum albumin and heat-precipitated serum albumin,
   recovering the urokinase-containing precipitate obtained thereby and suspending it in an alkaline medium to solubilize the urokinase, and
   collecting and purifying the solubilized urokinase.
2. A method according to claim 1 in which said trichloroacetic acid-precipitated serum is formed by the addition of a dilute solution of trichloroacetic acid to human blood serum.
3. A method according to claim 1 in which said silicotungstic acid-precipitated serum albumin is formed by the addition of a dilute solution of silicotungstic acid to human serum albumin.
4. A method according to claim 1 in which said heat-precipitated acidified serum albumin is formed by the application of heat to an aqueous solution of human serum albumin.
5. A method according to claim 4 in which dilute acid is added to an aqueous solution of human serum albumin and said serum solution is heated to a temperature of from 60° to 90° C.
6. A method according to claim 1 in which said urokinase is solubilized by suspending said urokinase-containing precipitate in a solution of sodium hydroxide at an alkaline pH no greater than pH 10, the solubilized urokinase then being purified by dialysis.
7. A method for the extraction of urokinase from urine which comprises:
   contacting said urine with an insoluble blood serum protein precipitate to extract urokinase from said urine, said urokinase being adsorbed on said precipitate,
   recovering the urokinase-containing precipitate and suspending it in an alkaline medium to solubilize the urokinase, and
   collecting and purifying the solubilized urokinase.

References Cited
UNITED STATES PATENTS

| | | | |
|---|---|---|---|
| 2,989,440 | 6/1961 | Singher et al. | 195—66 |
| 3,355,361 | 11/1967 | Lesok | 195—62 |

LIONEL M. SHAPIRO, Primary Examiner